United States Patent [19]

Halim et al.

[11] Patent Number: 5,514,951
[45] Date of Patent: May 7, 1996

[54] SUPPLY-DISCRIMINATING SUPPLY-ADAPTIVE ELECTRONIC SYSTEM

[75] Inventors: Raouf Halim, Laguna Niguel; Rajiv Gupta, Brea; Daryush Shamlou, Laguna Niguel, all of Calif.

[73] Assignee: Rockwell International Corporation, Seal Beach, Calif.

[21] Appl. No.: 226,198

[22] Filed: Apr. 11, 1994

[51] Int. Cl.$^6$ ............................................. G05F 1/40
[52] U.S. Cl. ................................. 323/901; 323/281
[58] Field of Search ................................. 323/266, 268, 323/270, 273, 274, 281, 901

[56] References Cited

U.S. PATENT DOCUMENTS

4,806,842  2/1989  Bittner .......................... 323/901
5,073,850  12/1991  Pace ............................... 323/901
5,359,281  10/1994  Barrow et al. ................. 323/901

Primary Examiner—Jeffrey L. Sterrett
Attorney, Agent, or Firm—George A. Montanye; David J. Arthur; Philip K. Yu

[57] ABSTRACT

A novel supply discriminator circuit is disclosed for detecting the level of a supply voltage during power-up of a system for configuring an integrated analog circuit such as a PCM-CIA card. The circuit compares a reference voltage with a divided down supply voltage and latches the result a predetermined delay later. The delay thus provides timing for the supply voltage to stabilize after power-up to assure accurate detection, as well as noise immunity from other devices.

9 Claims, 7 Drawing Sheets

SUPPLY-DISCRIMINATING SUPPLY-ADAPTIVE ELECTRONIC SYSTEM

RELATED PATENT APPLICATION

The present application is related to Patent Applications entitled EFFICIENT, WELL REGULATED, DC-DC POWER SUPPLY UP-CONVERTER FOR CMOS INTEGRATED CIRCUITS and ACCURATE REFERENCE GENERATION TECHNIQUE VALID DURING SYSTEM POWER-UP TRANSIENTS, filed on the same date, with Ser. Nos. 08/226,197 and 08/226,126, respectively, and assigned to the present assignee, Rockwell International Corp. The disclosures of the related Applications are incorporated herein by reference.

FIELD OF INVENTION

The present invention relates to electronic systems with supply-adaptive reference generation and more specifically to supplying and regulating external devices such as PCMCIA cards from the supply of a personal computer.

BACKGROUND OF THE PRESENT INVENTION

It has been the norm for electronic systems to operate from a five-volt power supply, thus requiring their electronic components to operate and meet all requirements from a single 5-volt supply. These requirements may include interfacing logic levels and timing specifications, and may apply to other devices such as other internal circuits. Increasingly, electronic systems, particularly analog IC's, are migrating to a 3.3 volt power supply which conforms to the recently approved JEDEC Standard 8-1A. This standard also defines 3.3 volt-compatible logic levels, which are different from those levels using a 5-volt supply. Although it would be desirable to have electronic components which are capable of conforming to either supply standard, redesigning the components and their front-end structures for operations on a 3-volt supply would create delays and uncertainties.

To further complicate the problem, in many system applications, it is not known beforehand whether the supply will be 5-volt or 3.3-volt. An example of this scenario is the PCMCIA-compatible cards, which may be functional at 3.3 volt but plugged into a 5-volt system such as a laptop computer. Detection and adaptation by the PCMCIA card thus become an integral part of the power-on process. Without the procedure prior to power-on, the PCMCIA card may be operating under an incompatible supply and system configuration.

Conventionally, to provide 3.3 volt supply to an integrated analog ("IA") circuit, which operates at a 5 volt level, a voltage regulator and voltage doubler are implemented with the IA circuit. The voltage regulator and voltage doubler generate a DC voltage of 5 volt regardless of the system power supply being 5 volt or 3.3 volt. This approach allows the 5-volt components of a system, such as a PCMCIA card for a notebook computer to be functional with both 5-volt and 3.3-volt supplies without the need to redesign the existing components.

The conventional approach, however, requires the system to generate an accurate reference voltage for the voltage regulator and voltage doubler so that the voltage generated thereafter is as close to 5 volt as possible. Although most IA circuits have an on-chip bandgap reference voltage, this bandgap reference voltage in many cases may only be operational under a 5-volt steady supply. Since the voltage regulator and voltage doubler also require an accurate reference voltage to generate a DC voltage of about 5 volt for invoking the bandgap voltage, the voltage regulator and voltage doubler cannot use the bandgap reference voltage as their reference voltage during system power-up transients. Therefore, it would be desirable to generate an accurate reference voltage, irrespective of the 3.3-volt or 5-volt power supply from the system, for the voltage regulator and voltage doubler to generate a 5-volt DC voltage so as to activate the bandgap reference voltage. It would also be desirable to use the bandgap reference voltage, solely, once the voltage regulator and voltage doubler are stabilized after the power-up transients have settled.

Furthermore, if the power supply from the system is already 5 volts, it would be desirable to take advantage of it directly by subsequently bypassing the voltage regulator and voltage doubler loop. This objective would require a mechanism of detecting whether the system supply is 5 volt or 3.3 volt. Once the detection is completed, the information can help the system reconfigure its own interfaces and other internal circuitry accordingly.

With respect to the voltage regulator and voltage doubler, it is also desirable to have an efficient DC-DC up-converter for converting a system supply voltage for the IA circuit without going above the CMOS processing tolerance.

SUMMARY OF THE PRESENT INVENTION

Therefore, it is an object of the present invention to have an accurate reference generator which is valid during system power-up transients for the voltage regulator and voltage doubler;

It is also an object to have an efficient voltage regulator and voltage doubler without going above the CMOS process tolerance regardless of whether the supply voltage is 3.3 volt or 5 volt;

It is also an object to be able to detect the voltage supply and to bypass the voltage regulator and voltage doubler when the voltage supply is 5 volt or when the voltage supply is consistent with the requirements of the IA circuit;

It is another object to be able to use the information regarding the status of the system power supply for reconfiguring the system even when the system is in "standby" mode.

A novel supply discriminator circuit is disclosed for detecting the level of a supply voltage during power-up of a system for configuring an IA circuit such as a PCMCIA card coupled to the system. The circuit compares a reference voltage with a divided-down supply voltage and latches the result after a predetermined delay. The delay thus provides timing for the reference voltage to stabilize after power-up to assure accurate detection, as well as noise immunity from other devices.

BRIEF DESCRIPTION OF THE DRAWINGS

Additional objects, features and advantages of the present invention will be apparent to those skilled in the art from the following description, wherein.

DETAILED DESCRIPTION OF THE DRAWINGS

Figure 1:
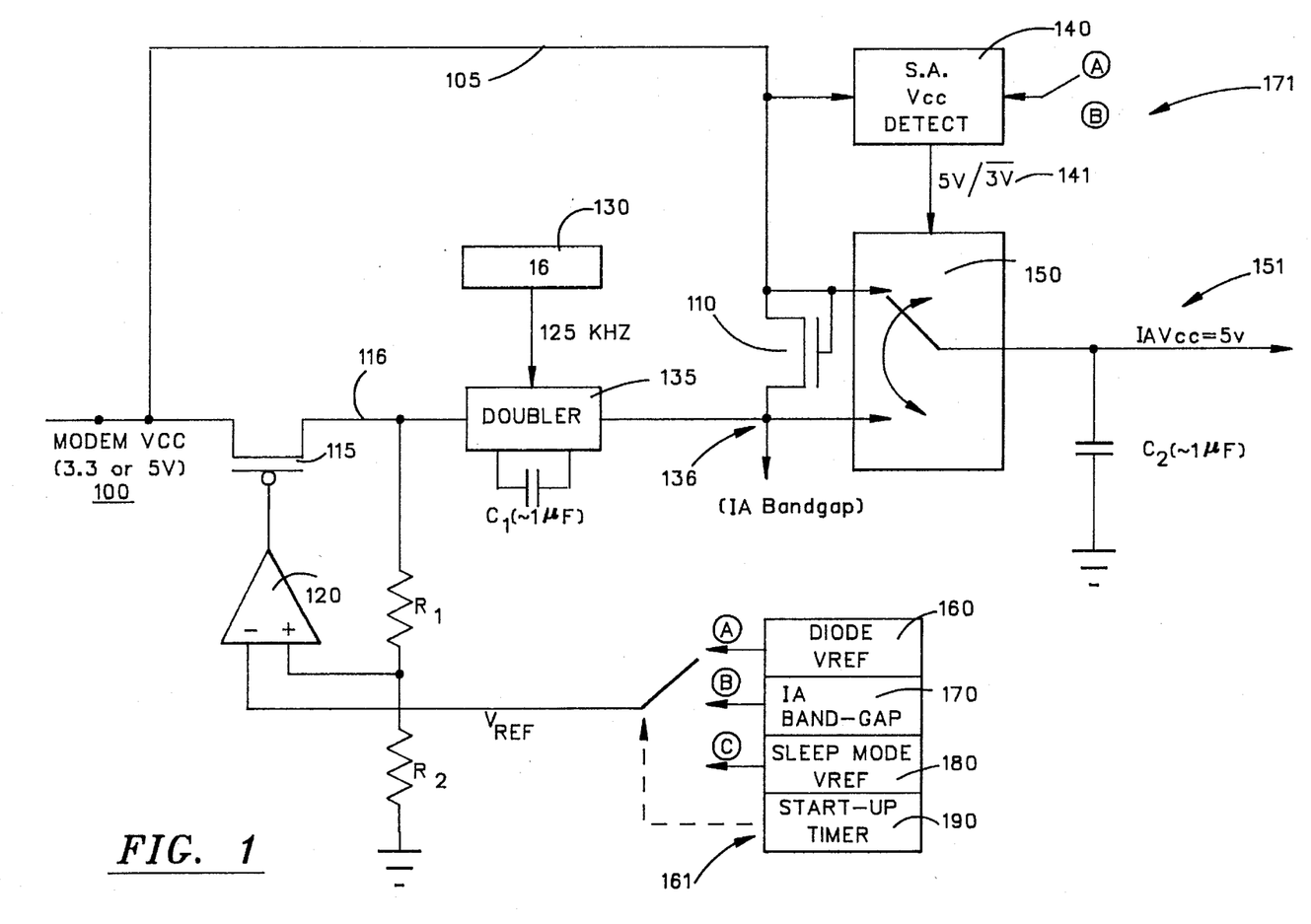
FIG. 1 illustrates a functional block diagram of a supply-adaptive voltage generation circuit in accordance with the present invention.

Reference is made to FIG. 1, where a functional block diagram of a supply-adaptive IA voltage generation circuit in accordance with the present invention is illustrated. Modem VCC 100 for the IA can be either 3.3 volt or 5 volt as supplied by a system such as a notebook computer. Modem VCC 100 is applied to a voltage regulator, which is formed by p-channel transistor 115, amplifier 120 and resistors R1 and R2. Voltage doubler 135 is coupled to the output of the voltage regulator at node 116. The operation of voltage doubler 135 is driven by clock 130. Currently the clock rate is set at 125 KHz. Output node 136 of voltage doubler 135 is connected to IA VCC node 151 through switch 150. It should be appreciated by those skilled in the art that modem VCC 100 represents the 3.3 V or 5 V which are supplied by a system such as a personal computer, while IA VCC 151 represents the 5 volt VCC operating an IA circuit such as a PCMCIA card.

Bypass path 105 connects between modem VCC 100 and switch 150. The output of switch 150 is applied to IA VCC 151 at 5 volt for the IA circuit. Supply-adaptive ("SA") VCC detection circuit 140 is connected to bypass path 105 and generates a control signal 141 (5 volt or 3 volt) for switch 150 to control switching. Reference generation circuit 161 has three modes: diode reference 160, IA bandgap reference 170 and sleep mode reference 180. Start-up timer 190 facilitates the necessary switching among the three reference voltages. Bandgap reference 170 can also be used for the IA circuit as IA reference 171. A diode-connected N-channel transistor 110 is connected between modem VCC 100 and node 136 for providing an initial voltage drop at node 136 when modem VCC 100 is first powered up.

The operation of the IA voltage generation circuit of the present invention is described as follows. When modem VCC 100 is first powered up toward its final 3.3 volt or 5 volt target level, diode reference voltage 160, which currently is a forward-biased diode-connected PNP transistor (to be described in FIG. 2), provides the requisite reference voltage for amplifier 120 of the voltage regulator. Node 116 is thus regulated at about 2.75 volt, without regard to whether modem VCC 100 is a 3.3 volt or 5 volt supply.

Figure 3:
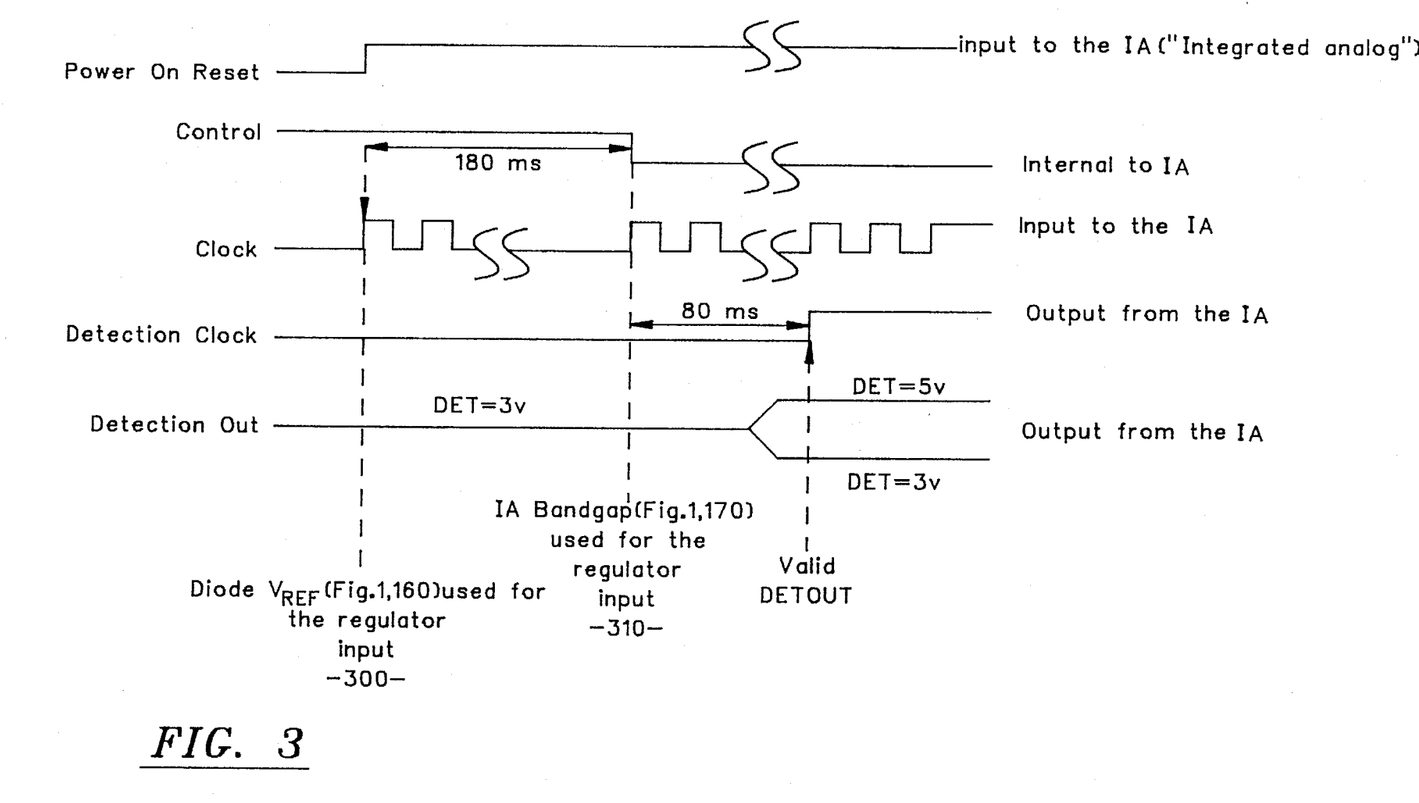
FIG. 3 illustrates a timing diagram for the supply-adaptive internal voltage generation circuit.

The voltage at node 116 is multiplied by voltage doubler 135 to about 5 volt at node 136, which is sufficient to activate the bandgap voltage of the IA device such that IA bandgap voltage 170 can now be used as a more precise voltage reference for the regulator's amplifier 120 after a predetermined time delay for modem VCC 100 to settle. A timing diagram is shown in FIG. 3, where diode reference 160 is first used as input to the regulator upon power-on reset (POR) and IA bandgap reference 170 is used after the 180 ms delay, as currently implemented.

Referring to FIG. 1, switch 150 is used to switch IA VCC 151 to modem VCC 100 through bypass 105 when modem VCC 100 is 5 volt as detected by SA VCC detector 140. This feature is advantageous in that once a 5 volt modem VCC is detected, it can readily supply the 5 volt to IA VCC 151 without the redundancy of operating the regulator and doubler circuitry.

As those skilled in the art will appreciate, IA bandgap voltage 170 is generally more precise as reference voltage than forward-biased diode 160 such that once IA bandgap voltage 170 is activated, diode reference voltage 160 can be de-activated to reduce power consumption.

"Sleep" mode reference voltage 180 generates the reference voltage for amplifier 120 of the regulator when the IA circuit is reviving from sleep mode, i.e. when the IA circuit is not used by the system for an extended period of time. When the IA circuit goes to sleep mode, so does its bandgap voltage reference to save power such that a reference voltage is needed for the voltage regulator when it awakens. However, sleep mode is different from the power-up situation because the voltage level supplied by modem VCC 100 is already known and detected prior to sleep mode. As such, sleep mode reference voltage 180 preserves the information on the level of the supply voltage so that the IA circuit need not go through the delay again in determining modem VCC 100 when it is awakening from sleep mode. The operation of sleep mode 180, as well as diode and bandgap references 160, 170, will be described in connection with FIG. 2.

Figure 2:
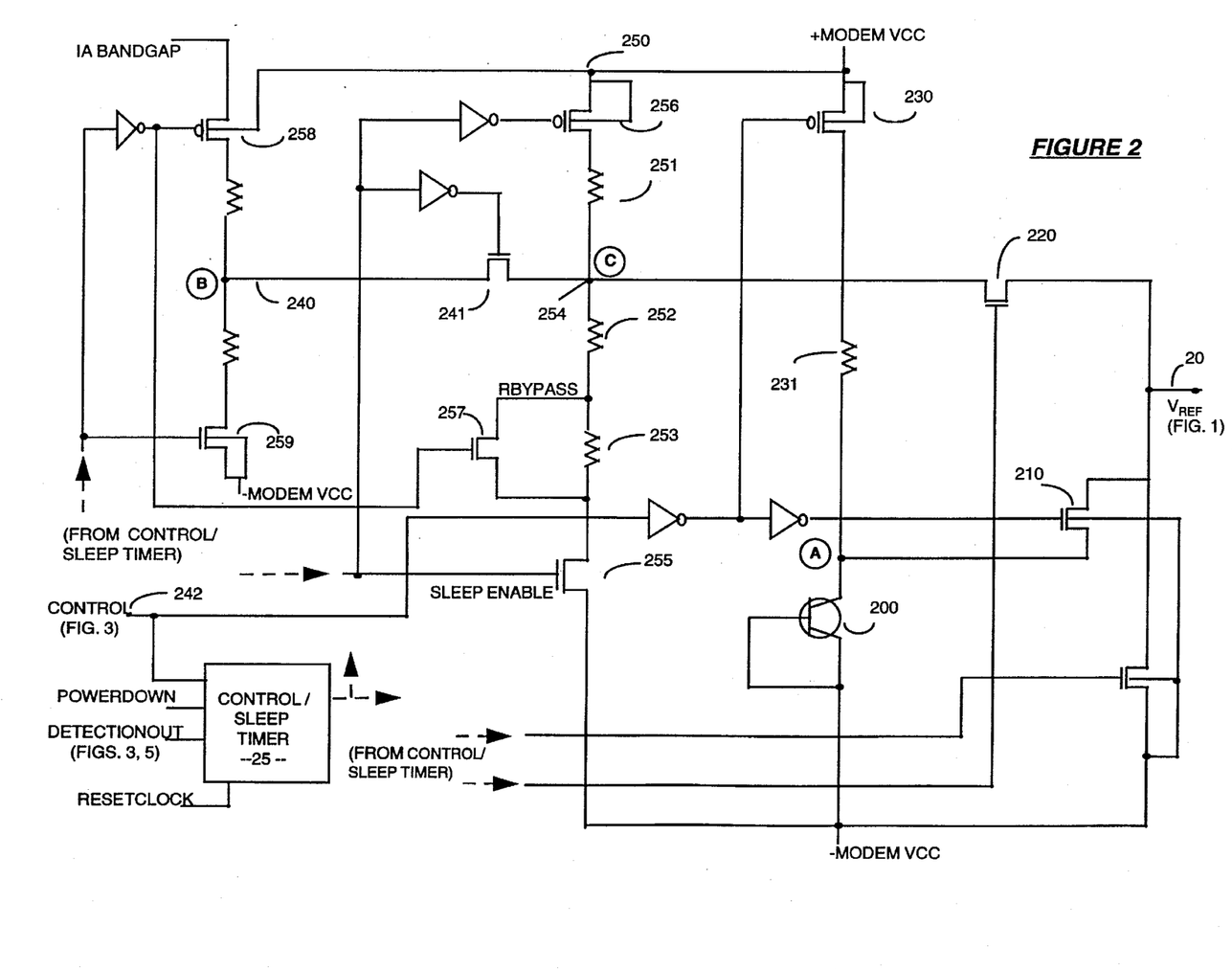
FIG. 2 illustrates a circuit diagram of the reference generator for the diode reference, bandgap reference and sleep mode reference as incorporated in the present invention.

Reference is made to FIG. 2, where a circuit diagram of reference generator 161 (FIG. 1) for diode reference 160, bandgap reference 170 and sleep mode reference 180 is further illustrated. As shown in FIG. 2, n-channel transistors 210, 220 and 241 control the switching among the three modes of reference voltages: diode reference voltage 200, bandgap reference voltage node 240 and sleep mode reference voltage node 254. Transistor 210 is turned on by CONTROL 242. Diode-connected PNP transistor 200, resistor 231 and p-channel transistor 230 form the connection when the reference is generated by the diode reference voltage 160 of FIG. 1.

The bandgap reference voltage 170 (FIG. 1) is available at node 20 when both transistors 220, 241 are turned on and transistor 210 is turned off. Sleep mode can be activated when transistor 241 is turned off to cut off the voltage at node 240 from node 254. Also, transistors 255, 256, 257 are turned on when sleep mode is activated. Also during sleep mode, transistors 258 and 259 are turned off to break the d.c. path to save power.

When coming out of sleep mode, CONTROL/SLEEP TIMER 25 opens a switch at transistor 257 by turning it off so that the voltage level at node 254 is boosted until node 254 is stabilized. CONTROL/SLEEP TIMER 25 and transistors 255 and 256 are then turned off and transistor 241 is turned on to go back into normal operation.

Upon power-up, transistors 200, 210, 230 and resistor 231 are turned on to provide the reference voltage at node 20. This voltage at node 20 can be used as a reference voltage for regulator 120 in FIG. 1 as Vref. After power supply at node 151 FIG. 1 (IAVcc) settles to around 5 volt, the voltage level at node 240 reaches about 1.25 volt. At this time transistors 210 and 230 are turned off while transistors 220 and 241 are turned on to provide the 1.25 volt at node 240 to node 220 so that it can be used as the regulator (120, FIG. 1) input at node 20. During this normal process, transistors 251 and 255 are turned off.

When this system is in sleep mode, transistors 255, 256 and 257 are turned on and transistors 241, 258, and 259 are turned off. As described above, transistors 258 and 259 are turned off to break the d.c. path to conserve power during the sleep mode.

During sleep mode, resistor divider formed by resistors 251 and 252 provides about 1.25 volt at node 120 to be used as the regulator input. However, it should be noted that the voltage level is preserved during sleep mode when the supply voltage is already detected at 3.3 volts. If the supply voltage is detected at 5 volts, then no information would need to be kept, because the system can readily use the supply voltage as it awakens in a 5 volt condition. In this case, the voltage regulator and multiplier can thus be disabled during sleep mode for the 5 volt condition detected.

When coming out of sleep mode, CONTROL/SLEEP TIMER 25 would delay the turning off of transistors 255 and 256 until the voltage level at node 240 is about 1.25 volts. Transistors 258 and 259 are also turned on. Transistor 257 is also turned off to provide more boost to the system that is coming out of sleep mode. When voltage at node 240 is settled, CONTROL/SLEEP TIMER 25 goes on to turn off transistor 255 and 256 and to turn on transistor 241.

When transistor 241 is on, normal mode proceeds. At this time the voltage level at node 240, about 1.25 volts, would provide the necessary voltage for node 20.

Reference is to FIG. 3, where a timing diagram for the supply-adaptive IA voltage generation is illustrated. Note that the diode reference is first used at 300 as an input to the regulator. A predetermined delay later, the band-gap reference voltage is activated and can be used as an input to the regulator at 310. Another time delay later, currently set at 80 ms, a valid detection of the modem VCC is made with the Detection Clock going high.

Figure 4:
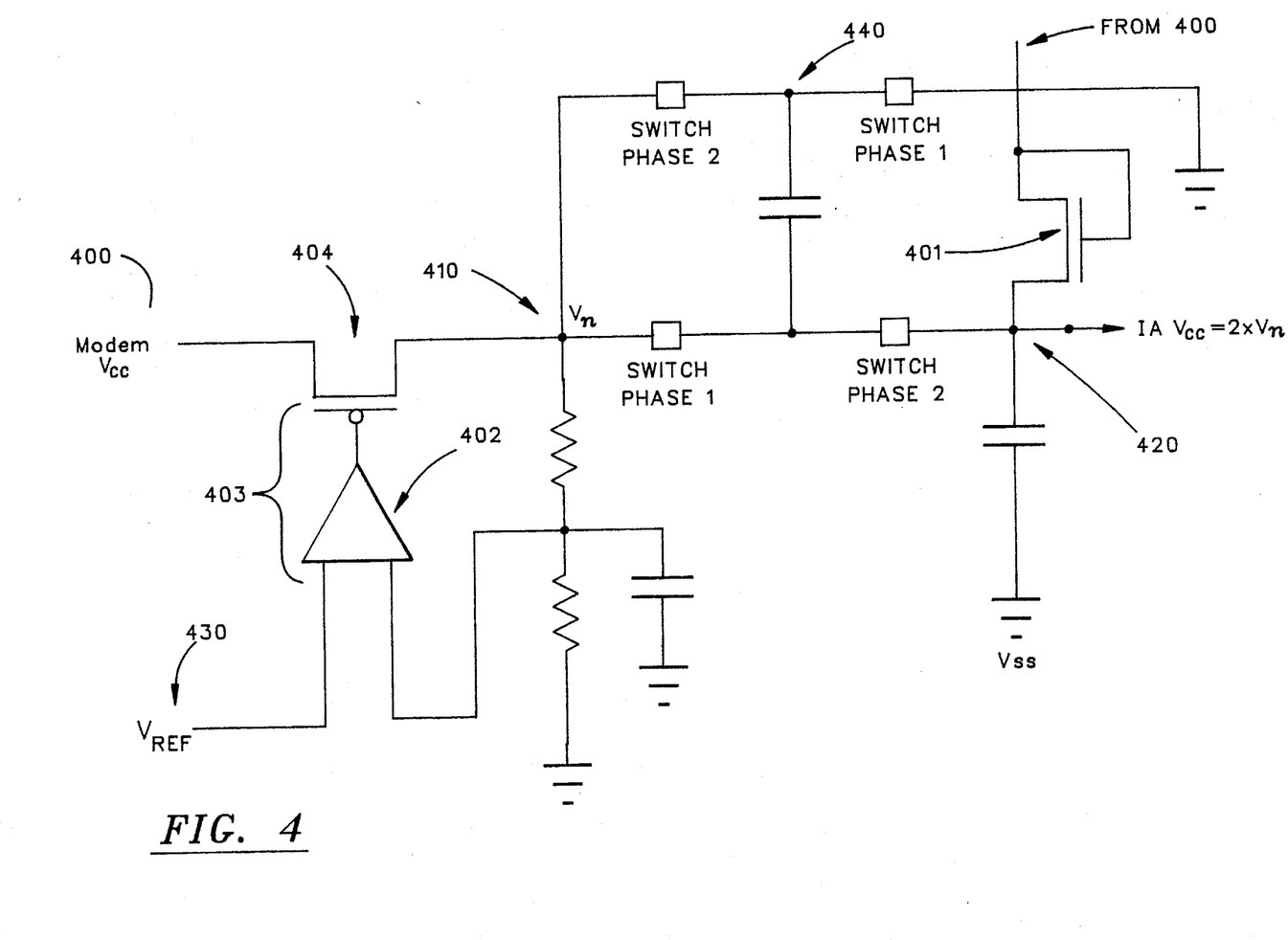
FIG. 4 illustrates a novel DC-DC power supply converter incorporated in the present invention.

Reference is made to FIG. 4, where an efficient and well-regulated DC-DC power supply converter as incorporated in the present invention is illustrated. Modem VCC 400 is first used to generate a voltage drop across diode-connected n-channel transistor 401 at node 420 for providing the start-up conditions. Modem VCC 400 is then regulated by regulator 403 formed by transistor 404 and amplifier 402. Once the supply voltage is regulated at node 410 (Vn), voltage doubler 440 doubles it to generate a supply for the IA circuit at node 420, which is equal to two times (Vn) at node 410. As such, the IA supply voltage can be made a real-number multiple of Modem VCC 400 by using voltage drop 401 and doubler 440. Switches, as illustrated in FIG. 4, act to provide the phases 1 and 2 needed for doubling the voltage from node 410 to node 420. Those skilled in the art would appreciate that other switching mechanism may be implemented to take full advantage of the present invention.

Figure 5:
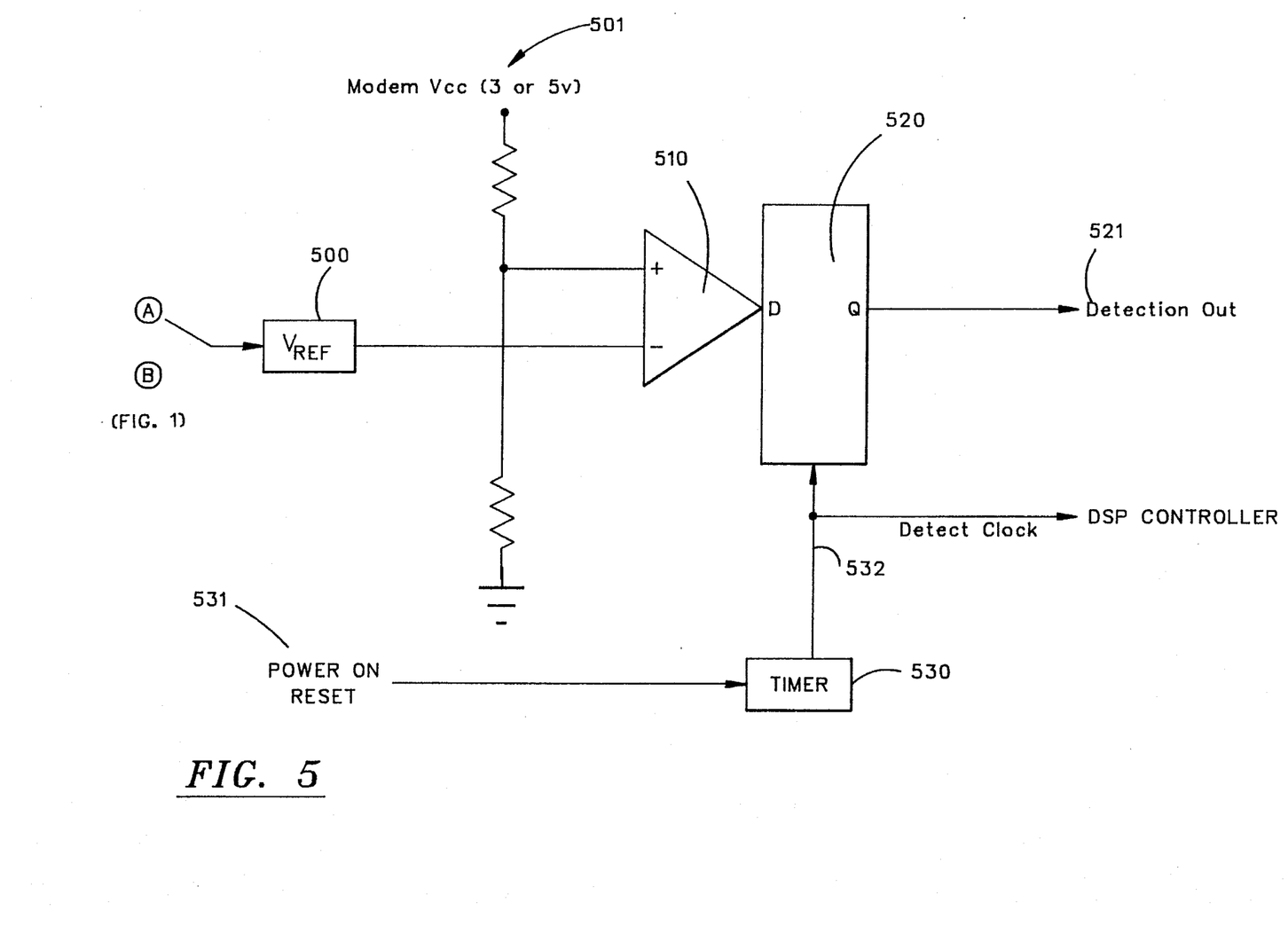
FIG. 5 illustrates a circuit diagram of a novel supply-adaptive VCC detection circuit incorporated in the present invention.

Referring to FIG. 5, a circuit diagram of a novel supply-adaptive Vcc detect circuit 140 (FIG. 1) incorporated in the present invention is illustrated. The inverting input to comparator 510 is reference generator 500, which may come from a temperature-regulated supply-insensitive reference generator. The non-inverting input to comparator 510 is a resistor divider for Modem Vcc 501, which is either 3.3 volt or 5 volt. The output of comparator 510 is applied to latch 520, which is clocked by Detection Clock 532 from timer 530. Detection Clock 532 is also used to reset other components during power-on. Timer 530 is reset by power-on reset (POR) 531 when the system supply voltage is first turned on.

During the initial application of a power-on reset (POR), timer 530 holds Detection Clock 532 low for a predetermined time, ensuring that all devices are to be held in reset state upon power-on. Comparator 510 then compares the divided-down Modem Vcc 501 with a voltage generated by Vref 500. If Modem 501 is 5 volt, comparator 510 output is high and a "1" is latched. If Modem Vcc 501 is 3.3 volt, a "0" is latched. At the end of the time delay, DETOUT 521 is thus a valid indication of Modem VCC 510, and Detection Clock 532 goes high allowing all other devices to come out of reset with configuration consistent with Modem Vcc 501.

Figure 6:
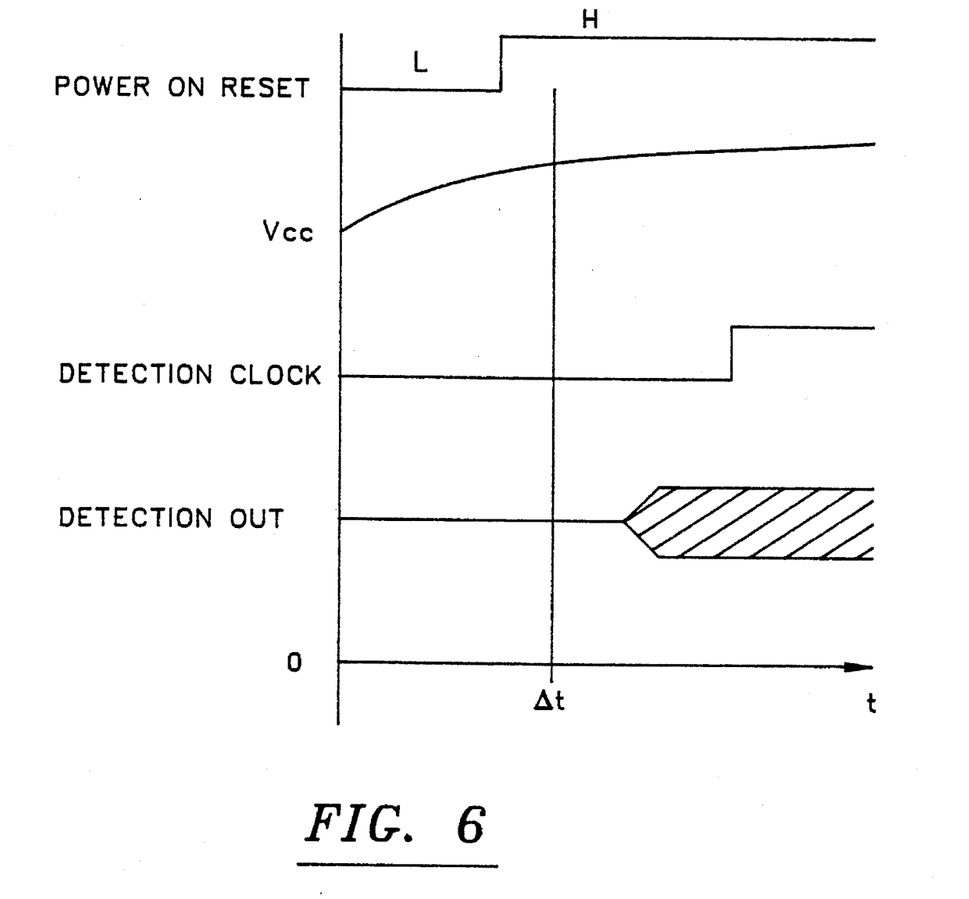
FIG. 6 illustrates the timing behavior of the supply-adaptive detection circuit.

Those skilled in the art will appreciate the advantages of using Detection Clock 532 in accordance with the present invention. Because other devices are also in reset while the supply discriminating circuit is making its detection, there is little noise on Modem Vcc 501 such that comparator 510 can compare accurately. Also, it ensures that when the complete system starts operating, it is already correctly configured for the supply voltage used in the system. FIG. 6 illustrates the timing relationship.

Figure 7:
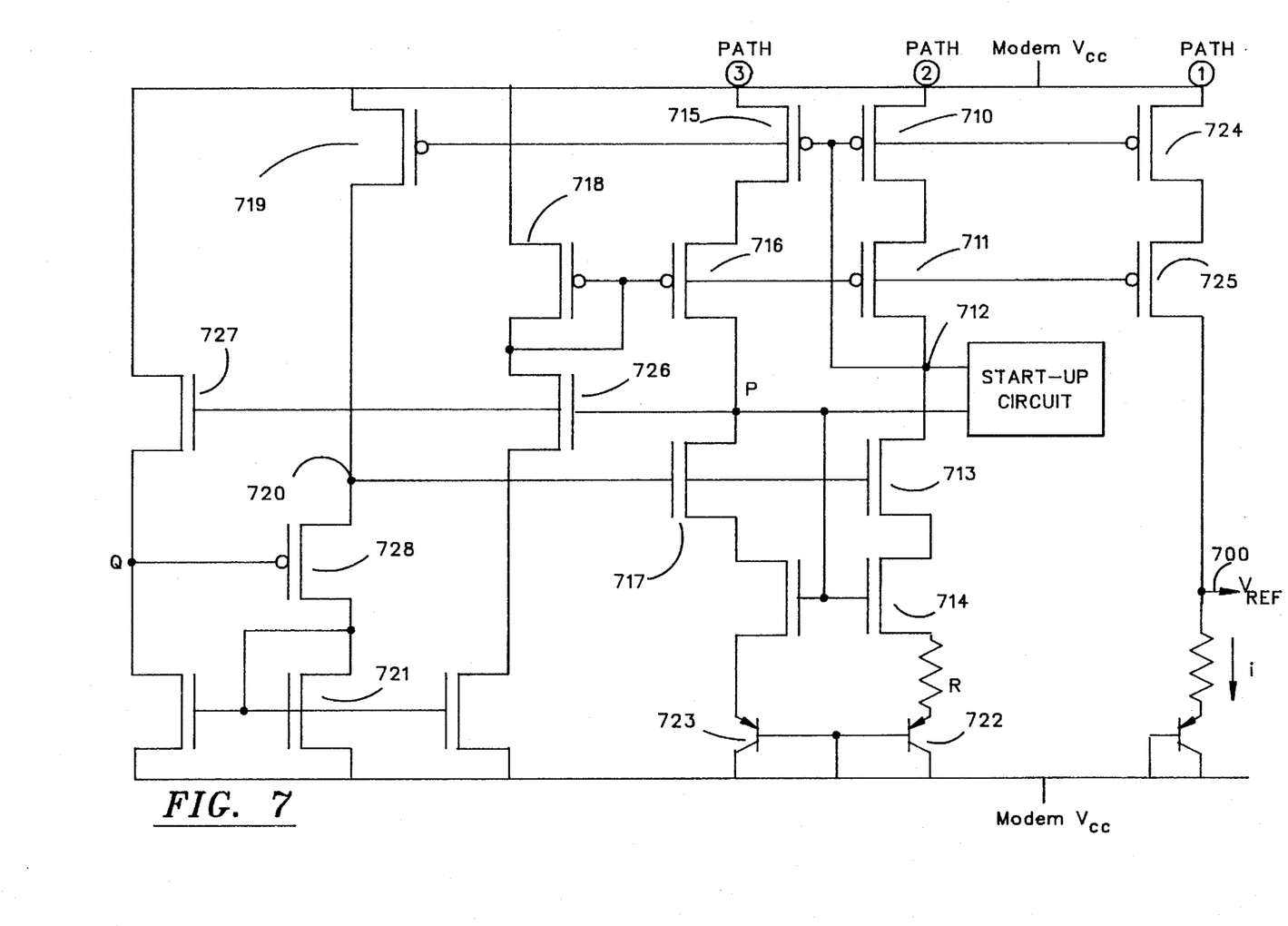
FIG. 7 illustrates the circuit diagram of another embodiment of the reference generation circuit for the voltage regulator shown in FIG. 1.

Reference is made to FIG. 7, where another embodiment of reference generation circuit for the voltage regulator shown in FIG. 1 is illustrated. This reference voltage generation circuit is capable of providing a bandgap reference voltage operational across the entire voltage range of the system supply voltage, i.e. from 3 volt to about 5.25 volt. The biasing scheme including level-shifting, as shown, is necessary for low-voltage operation, which may be below 3.0 volt. Currently, the biasing scheme works down to as low as: Vgs(p-channel)+V(diode)+3 Vdsats, or approximately 2.5-plus volt.

Referring to FIG. 7, in order to generate a bandgap Vref at node 700 of about 1.2 volt, p-channel transistor 710 is biased by p-channel transistors 715, 719. P-channel transistor 711 is biased by transistors 716, 718. N-channel transistor 713 is biased by n-channel transistor 717 and node 720. Notice that node 720 is derived from level-shifting the voltage at node P by transistors 727, 728 successively. The net result is that current paths 1,2, and 3 experience identical currents and Vref is equal to the diode voltages at transistors 710, 711,713 plus (i times R).

What is claimed is:

1. A circuit for detecting the level of a supply voltage from a system during power-on reset of said system for configuring an integrated device coupled to said system, said supply voltage having one of two voltage levels, comprising:

reference generator means coupled to said integrated device for generating a reference voltage responsive to said supply voltage rising to a predetermined level during power-on reset of said system;

a resistor divider for dividing said supply voltage to a first voltage based on a predetermined division factor;

a comparator for comparing said first voltage with said reference voltage and generating an output signal based on the result of comparing;

a timer for generating a clock signal after a predetermined delay from power-on reset, said delay allowing sufficient time for said supply voltage to stabilize and reach its final level;

a latch for latching said output signal of said comparator responsive to said clock signal from said timer, such that said output signal reflects which one of said two voltage levels said supply voltage has.

2. A circuit according to claim 1, wherein said clock signal from said timer also activates other component of said system and said integrated device which have been in reset during power-on reset of said system.

3. A circuit according to claim 1, wherein said reference voltage is derived from a band-gap voltage of said integrated device, said bandgap voltage being activated upon said supply voltage reaching said predetermined level.

4. A circuit according to claim 2, wherein said reference voltage is derived from a band-gap voltage of said integrated device, said bandgap voltage being activated upon said supply voltage reaching said predetermined level.

5. A method of supply discriminating for an integrated circuit coupled to an electronic system by detecting the level of a supply voltage from the electronic system when the electronic system is first power-on reset, said supply voltage having one of two voltage levels, comprising the steps of:

said integrated circuit providing a reference voltage with a reference generator responsive to said supply voltage's rising to a predetermined level during power-on reset of the electronic system;

dividing said supply voltage down to a first voltage with a resistor divider based on a predetermined division factor;

comparing said first voltage with said reference voltage using a comparator and generating an output signal representative of the result of comparing;

generating a clock signal after a predetermined delay from power-on reset to allow said supply voltage to stabilize and reach its final level;

latching the output signal from said comparator when said clock signal is generated, such that said output signal reflects which one of said two voltage levels said supply voltage has.

6. The method according to claim 5, wherein said reference voltage is derived from a bandgap voltage from said integrated circuit, said bandgap voltage being activated upon said supply voltage from the electronic system reaching said predetermined level.

7. The method according to claim 6, wherein said clock signal from said timer also activates other components of the electronic system and integrated device.

8. The method according to claim 5, wherein said clock signal from said timer also activates other components of the electronic system and integrated device.

9. A circuit for detecting the level of a supply voltage having one of two levels from a computer system during a power-on reset cycle initiated by a power-on reset signal, for configuring an integrated device coupled to said computer system, said integrated device having a bandgap voltage operational at a predetermined voltage of said supply voltage, said circuit comprising:

reference generator means coupled to said integrated device for generating a reference voltage through said bandgap voltage activated by said supply voltage rising to said predetermined level during power-on reset cycle;

resistor divider means for dividing said supply voltage to a first voltage based on a predetermined division factor;

comparator means for comparing said first voltage with said reference voltage and generating an output signal based on the result of comparing;

timer means for generating a clock signal after a predetermined delay from receiving said power-on reset signal to allow said supply voltage to reach its final level;

a D-type latch for latching the output from said comparator means upon receiving said clock signal from said timer means, the latch output of the D-type latch thus representing which one of the two levels said supply voltage is at.

* * * * *